United States Patent
Braga Lourenço et al.

(10) Patent No.: US 10,607,568 B2
(45) Date of Patent: Mar. 31, 2020

(54) METHOD FOR PROCESSING VIRTUAL POINTER MOVEMENT

(71) Applicant: SAMSUNG ELETRÔNICA DA AMAZÔNIA LTDA., Campinas, São Paulo (BR)

(72) Inventors: Alvaro Augusto Braga Lourenço, Manaus (BR); Taynah De Araujo Miyagawa, Manaus (BR); Juscelino Tanaka Saraiva, Manaus (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 41 days.

(21) Appl. No.: 16/013,675

(22) Filed: Jun. 20, 2018

(65) Prior Publication Data
US 2019/0287483 A1 Sep. 19, 2019

(30) Foreign Application Priority Data
Mar. 13, 2018 (BR) ...................... 10 2018 004967 4

(51) Int. Cl.
*G09G 5/08* (2006.01)
*G06F 3/0481* (2013.01)
(Continued)

(52) U.S. Cl.
CPC ............... *G09G 5/08* (2013.01); *G06F 3/016* (2013.01); *G06F 3/04812* (2013.01)

(58) Field of Classification Search
USPC ........................................................ 345/157
See application file for complete search history.

(56) References Cited

U.S. PATENT DOCUMENTS 5,692,117 A * 11/1997 Berend ................ G06T 11/001
  345/475
5,808,601 A   9/1998 Leah et al.
(Continued)

FOREIGN PATENT DOCUMENTS

CN         105498213 A    4/2016
WO   WO 2017/051985 A1   3/2017

OTHER PUBLICATIONS

Alex Olwal et al., "The Flexible Pointer: An Interaction Technique for Selection in Augmented and Virtual Reality", In Conference Supplement of UIST '03 (ACM Symposium on User Interface Software and Technology), Vancouver, BC, Nov. 2-5, 2003, pp. 81-82.

*Primary Examiner* — Chineyere D Wills-Burns (57) ABSTRACT

A method for processing virtual pointer movement. The method and related components that, when active in an application or virtual environment as a whole, will aid a user in tasks that would require more effort and dexterity with currently implemented pointers. The method uses three operations (separated into two components, Smooth Pointer and Aim Assist Area) that result in a systematic asynchronous movement of a controller and its interface counterpart. Smooth Pointer, responsible for the pointer's stability, is a group of features that manage the process of smoothing the controller's rotation and final virtual pointer position by using a continuous interpolation process. Furthermore, Aim Assist Area is the component (based on two methods: Magnetism and Friction) that describes how the pointer will suffer interferences from the environment to help users have more stability while aiming at elements available in the interface.

7 Claims, 5 Drawing Sheets

(51) Int. Cl.
*G09G 5/34* (2006.01)
*G06F 3/0484* (2013.01)
*G06F 3/0346* (2013.01)
*G06F 3/01* (2006.01)

(56) References Cited

U.S. PATENT DOCUMENTS

| | | | |
|---|---|---|---|
| 2006/0033712 | A1 | 2/2006 | Baudisch et al. |
| 2006/0125799 | A1* | 6/2006 | Hillis ................... G06F 3/011 345/173 |
| 2009/0227296 | A1* | 9/2009 | Kim ..................... G06F 3/016 455/566 |
| 2010/0009733 | A1 | 1/2010 | Garvin et al. |
| 2012/0146900 | A1* | 6/2012 | Ishimoto ............. G06F 3/04812 345/157 |
| 2017/0038857 | A1* | 2/2017 | Moran .................. G06F 3/017 |
| 2017/0075480 | A1* | 3/2017 | Fleureau .............. G06F 3/0416 |
| 2017/0285903 | A1* | 10/2017 | Duong ................. G06F 3/0488 |
| 2018/0088673 | A1* | 3/2018 | Bhalla .................. H04W 4/80 |
| 2019/0227642 | A1* | 7/2019 | Nishizawa ............ G06F 3/014 |

* cited by examiner

METHOD FOR PROCESSING VIRTUAL POINTER MOVEMENT

CROSS-REFERENCE TO RELATED APPLICATIONS

This application claims the foreign priority benefit of Brazilian Patent Application No. 10 2018 004967 4, filed on Mar. 13, 2018 in the Brazilian Intellectual Property Office, the disclosure of which is incorporated herein by reference.

FIELD

The present invention refers to a method for processing a virtual pointer in an application or virtual environment through a systematic asynchronous movement comprising the steps of: performing the stabilization of the pointer movement by a smooth pointer component; using magnetism so as to the pointer to move inside a specified area proportionally to movements done on a main area; and using friction for creating the concept of "resistive drags".

BACKGROUND

Virtual Reality (VR) is a mobile or computer simulated environment that gives the user a sense of immersion and presence through three-dimensional (3D) images and the support of visual, auditory and/or tactile feedback. Augmented Reality (AR) is an overlay of computer-generated contents (e.g. sound, video, graphics, GPS data) on the real world where, although in it, these contents do not and/or cannot interact with this world. Mixed Reality (MR) is almost the same as AR, but the created content is anchored and interacts directly with the world in real time and vice-versa. These technologies are all part of an emerging world of Virtual Environments (VEs), but the most prominent is virtual reality.

Although part of science fiction and a technology desired for decades, virtual reality as we know today arised after a 2010 prototype and 2012 Kickstarter campaign that would later become the PC-powered Oculus Rift. Hospitals and research labs have already been used VR for more than 20 years by then, but the costs and structure required to maintain it are difficult to reach for consumer-level users.

In the past five years, the technology behind VR and its multiple applications has advanced quickly. Several competitors have emerged since the Oculus Rift, from HTC Vive® to gaming console-powered PlayStation® VR and mobile headsets like Google Daydream® and Samsung Gear® VR. Through these companies, not only affordable-priced hardware has entered the market, but also new technologies and interaction approaches were produced.

Developers are directing their efforts to testing and creating applications, games, experiences and exploring the next features that this technology can offer. At the same time, the technology has gathered the interest of a number of professionals in an attempt to handle existing problems on the hardware and also pursuing better and detailed studies regarding the current shortcomings/challenges of the virtual reality applications. The design of appropriate 3D interaction techniques in virtual environments is one of these challenges.

The act of selecting an object in a 2D interface is a familiar interaction that normally involves an input device (often a mouse) that when moved will affect the position of a virtually created cursor. Numerous hardware and operating system enhancements were applied over the years to make it as accurate and seamless as possible. In 3D environments, although having the positive side of allowing multiple selection styles and freedom of movement, this is a more demanding task that requires a great deal of dexterity. This issue is further increased by the fact that, even in the most sophisticated virtual environments, it is still difficult for a user to accurately understand and define object positioning and spatial limits. Accurate object selection in VEs can also be affected by how the interfaces are created/organized and tasks such as using a scroll bar, manipulating timelines or trying to make other kinds of fine selections can be too demanding with the use of available controls.

Since object selection is one of the most common and fundamental interactions in VEs, a poorly designed interaction tool can lead to an overall bad user performance/experience even in the most refined applications. Past studies have revealed that virtual pointing techniques result in better selection effectiveness compared to other 3D methods, so the disclosed matter aims to create methods and components that can improve current virtual pointers and make user tasks easier to perform.

In the prior art, the following technologies that enable the implementation (technical viability) of the present invention can be found:

1. Nearly all digital interfaces today are graphical user interfaces (GUIs). An interface is a set of data, commands/controls and/or menus/navigation displayed on a screen, through which a user can communicate with a program—in other words, GUI is the part of a system through which the user will interact. The first commercially available GUI was released in 1981 and since then it kept evolving to adjust to new technologies and types of digital devices currently available.

2. GUIs are affected by and can be controlled by a number of input devices/methods, such as (but not limited to): mouse/keyboard, controllers, touchscreens and motion detection.

3. Most of the existing input devices/methods are based on the idea of positioning its virtual representation on a display. For the sake of clarity, this representation is referred to as pointer.

4. Head-mounted display (HMD) is a device that is used over the head and that features a display in front of one or both user's eyes. This display streams data, images and other types of information. Furthermore, HMDs can have a display for each eye (e.g. Oculus Rift) or one display for both eyes (e.g. Samsung Gear VR). Basically, HMD is a content-viewing hardware. Initially created for the aviation industry, the HMD is used as the main hardware in the VR/AR industry. Types of HMD include: Slide-on HMD (mobile-based, uses smartphone as display, for processing and tracking), Tethered HMD (PC-based, provides everything aside from processing, which is done by the PC) and Integrated HMD (totally independent device, containing everything for delivering an immersive experience).

The patent document CN105498213A titled "Aiming method and device in shooting game", published on Apr. 20, 2016, by HANGZHOU WIZARD GAME TECH CO LTD, proposes the use of targeting techniques for shooting games, comprising of a terminal with touch screen displays, which behavior varies according to sight position and creates an amplification of targeting region that ultimately creates an enlarged area to perform shooting operations. Although this invention seems to serve as an assistance for shooting operations, it differs from the present proposal because of its use cases, equipment, and the method itself: VR pointers are not limited to shooting game operations, serving to any VR application interface that offers aiming, clicking, and dragging tasks; VR technology does not use display capable touchscreens, but full 360° rotation capable touchpads and buttons that integrate with head mounted displays; and finally, our proposed invention uses distinct methods that perform pointer stability, assisted aiming, and resistive drags.

The patent document WO2017051985, titled "Haptic simulating device", published on Mar. 30, 2017, by KANG TOO HWAN, discloses a solution to be applied on simulator devices (especially hardware and peripherals related to Virtual Reality) for enhancing the users' immersion and presence through a specific haptic feedback. The invention is an evolution of that they call conventional techniques for creating the feeling of real movement/force rotational force, slip and vibration are all generated through it for this purpose. Furthermore, the invention can be implemented in small devices (such as a game controller) and larger ones (such as a bicycle handle), because its goal is to be used for a number of purposes. Although it is related to VR and controllers, document WO2017051985 differs from the present invention because it defines behaviors and construction models for hardware products in its claims instead of how the virtual pointer movement would be processed.

The patent document US20100009733A1, titled "Game aim assist", published on Jan. 14, 2010, by Sony Comp Entertainment US, refers to assisted aiming in electronic games. The idea is based mostly on games in third person view wherein the interface between the game player and the game character is made through a controller with analog stick (joystick). The created method makes it easier for a player to aim at objects/enemies—especially when in great number—through the use of a user-defined focus area, and other points such as a method for choosing targets according to the distance between game character and objects. Although it directly relates to an aim assist area, it differs from the present invention because this method is directed at gaming interfaces and the idea of aiming while using an in-game weapon and a real-world analog stick, while also focusing on the third-person view (where a game character is placed in the middle of the screen and other interaction points appear around it). These differences become clear as pointed below:

a. On claims 3 and 23, document US20100009733A1 describes about a method based on an input from a single analog control stick but the present invention proposes methods that do not limit the controllers model/format, only indicating that it must be a VR/AR related controller;

b. On claims 12 and 13, document US20100009733A1 describes methods for adjusting the aim and focus area depending on a weapon being operated by a game character but the present invention does not limit the methods to scenarios where characters and weapons are available;

c. On claim 15, document US20100009733A1 describes a user-customizable focus area but the present invention is not based on user input—instead, it is based on the interface.

The patent document US20060033712A1, titled "Displaying visually correct pointer movements on a multi-monitor display system", published on Feb. 16, 2006, by "Microsoft Corp", is focused in creating a solution for moving a pointer across monitor boundaries in a correct manner, including situations where monitors are in different settings (position), and have different sizes and resolutions. The document US20060033712A1 comprises a multi-monitor computer system, a display surface and a virtual space. The method establishes a virtual space for the multi-monitor computer system with a plurality of virtual display areas wherein these displays are arranged in the virtual space reflecting the visual appearance of how the monitors appear to the user (according to a previously done calibration). This calibration also gathers information about relative screen resolution and pixel resolution. In the end, the pointer is moved, and its representation adapted to a seamless movement to be displayed in the user's monitors. Although it is directly related to pointers and it allows any type of hardware input, document US20060033712A1 differs from the present invention because it deals directly with multi-screen systems and it focus in moving the pointer in a correct manner between these screens.

The patent document U.S. Pat. No. 5,808,601A, titled "Interactive object selection pointer method and apparatus", published on Sep. 15, 1998, by IBM, focuses on providing an improved selection pointer control method in which the selection pointer is drawn towards selectable items when near enough, according to a mathematical process. It further describes a system in which its mouse (or other type of control hardware) has two identities: real and virtual. The idea was to make it easier for users to select items on small interfaces and displays by having a method of facilitated pointing/selection. The behavior and execution in document U.S. Pat. No. 5,808,601A are very similar to the aim assist method of the present invention; however, its difference lies in the solution's mathematical process and results. Furthermore, the present invention comprises the combination of 3 different methods in order to achieve a better pointer interaction instead of relying only on the "magnet" aspect.

a. On claim 1, the patent document U.S. Pat. No. 5,808,601A describes the use of the center of the object to determine the distance from the pointer to it by checking if the magnitude of the value calculated is greater or equal to the D value. However, the present invention proposes a different approach wherein a specific position on the main area is calculated to find a relative position on the specified area—this means that we calculate our relative position based on the middle of each direction (vertical/horizontal) but not from the center itself. In the same way, in the method of the present invention it is possible to set the aim assist behavior based on each side/direction of the object (left, right, top or bottom) and this behavior will happen independently for each individual direction.

b. On claim 4, the patent document U.S. Pat. No. 5,808,601A describes a pointer that is independent of the actual physical location of the controller, but in the present invention the pointer depends completely on its physical position over an object to determine a relative position in the specified area.

Non-patent document Poster, titled "The Flexible Pointer: An Interaction Technique for Selection in Augmented and Virtual Reality" by A. Olwal and S. Feiner (available online at https://uist.acm.org/posterexamplegallery/pointer.pdf, last access on July 2017) describes a virtual flexible pointer that allows a user to point and indicate objects more clearly, even if partially hidden/obscured. While using hand position and orientation to control the pointer's length and curvature, this invention uses human behavior as reference for its construction—the inventors' informal observations revealed that users do not always point straight when indicating objects of interest, especially when pointing to something that is not currently visible, and these curved gestures are often combined with movement. Despite using the same curved representation, this solution differs from the present invention because the curvature used in our ray is used for representing resistive drags—the curve only occurs when the user holds and drags an interface element instead of being used for normal selection.

SUMMARY

In view of the aforementioned challenges and deficiencies related to 3D interaction techniques, the method of the present invention focuses on improving virtual pointers. The idea is to create methods and components that, when active in an application or virtual environment as a whole, will aid the user in tasks that would require more effort and dexterity with currently implemented pointers. The present invention uses three methods (separated into two components, Smooth Pointer and Aim Assist Area) that result in a systematic asynchronous movement of a controller and its interface counterpart.

Smooth Pointer is a group of features that manage the process of smoothing the controller's rotation and final virtual pointer position by using a continuous interpolation process. The pointer's ray curve (its main movement feedback) is also created as part of this component. In other words, these elements are responsible for the pointer's stability.

Furthermore, Aim Assist Area is the component responsible for facilitating content aiming by making the pointer suffer interferences from the environment and interface. This component works through 2 methods: Magnetism and Friction. Magnetism is the main responsible for assisting the user's aim in all sorts of hover areas, especially the smaller ones, through the creation of invisible "magnetic fields"— the pointer will be attracted to the fields and, at the same time, it will be harder to leave these interest areas by accident. Friction is the method that complements aim assisting by smoothing pointer movements when an item is selected through press and hold, creating "resistive drags"— Friction affects dragging feedbacks and its intensity can change according to the interface (e.g. amount of contents). It is also important to note that aim assisting can happen with only one active method if necessary.

The method of the present invention goes beyond the existing solutions in the prior art, because: (i) it was created by considering the needs and challenges of 3D environments; (ii) and, since it is a combination of methods, it offers better results and a higher range of applicability.

BRIEF DESCRIPTION OF THE DRAWINGS

The objectives and advantages of the present disclosure will become clearer through the following detailed description of the example and non-limitative figures presented at the end of this document, wherein.

DESCRIPTION OF EMBODIMENTS

As mentioned above, the present invention uses two components (Smooth Pointer and Aim Assist Area) that result in a systematic asynchronous movement of a controller (which can be used for defining a physical position) and its interface counterpart (virtual position). By using these components, both movement stabilization and a facilitated way of interacting within a 3D environment, especially in the tasks of selecting and dragging contents, are achieved.

As it will become clearer during the detailed description, the present invention can be embedded/applied/used on a plurality of virtual environments, applications and input devices.

Figure 1:
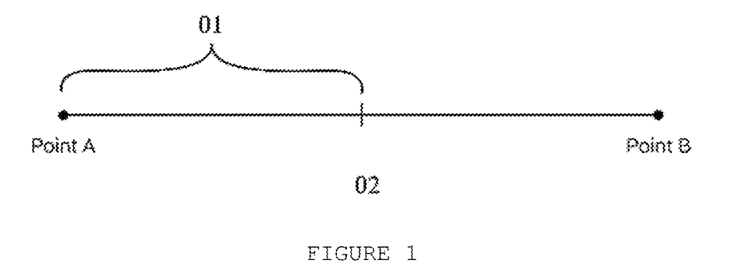
FIG. 1 presents a simplified graphic of an interpolation process.

FIG. 1 presents the interpolation process. This is a process where given two points and a third parameter—the interpolation value (01)—an intermediate point (02) is generated in between these points, proportional to the interpolation value.

Figure 2:
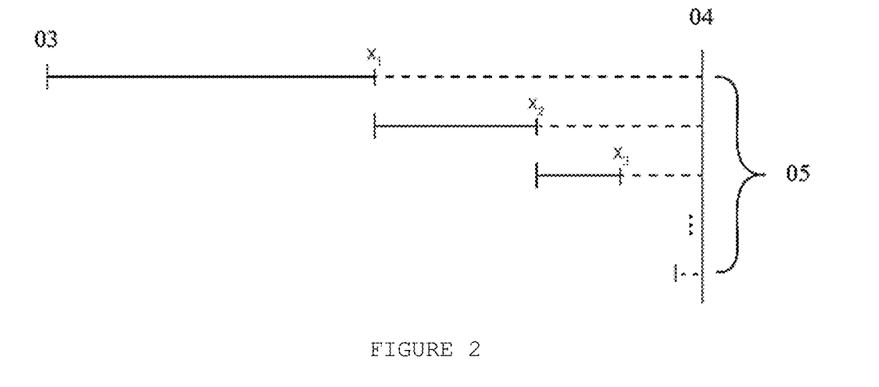
FIG. 2 discloses the concept of continuous interpolation.

FIG. 2 illustrates the continuous interpolation, with an initial position (03), target position (04) and the iterations happening over time (05). When the continuous interpolation is used, it means that there will always be an intermediate point that will be used to interpolate the value again, thus creating an interpolation of an interpolation. However, since the interpolation value is never set to 100%, the final point is never achieved and, at the same time, instead of going straight to a point the system will always be interpolating to a final value. These two theories are the foundations used in the present invention.

Smooth Pointer is a group of features that manage the process of controller rotation smoothness and final pointer position using a continuous interpolation process (in 3 steps).

The first step is to achieve a smooth controller rotation. Since the value is never absolute (related to the target position), the rotation will always be only as close as possible to the expected rotation. Since it will be a continued process of "trying to get there", the end result will be a smooth rotation. Furthermore, it is important to add that rotation is the basis of controller movement in virtual environments, especially the ones without space tracking.

Figure 3:
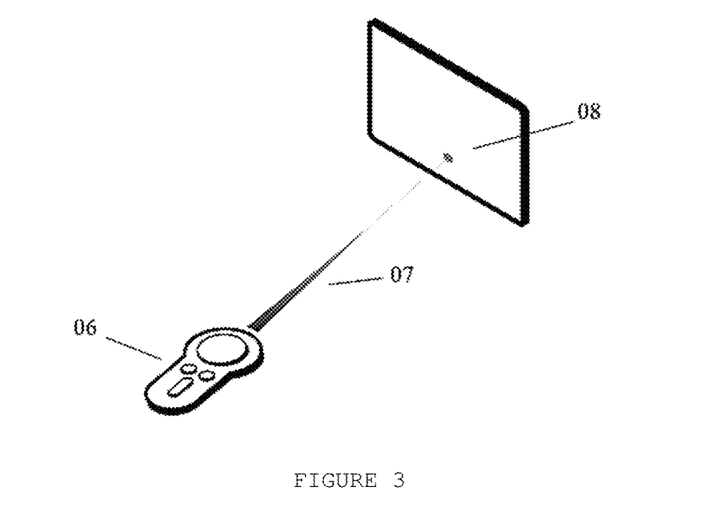
FIG. 3 discloses an example representation of a reticle (often referred to as pointer), ray and input device (a physical controller).

For a better understanding of further steps, FIG. 3 illustrates a reticle (08), which is the representation of the final point achieved by a pointer in an interface; an input device (06), that is often displayed in Virtual Environments so the user can have a better understanding of what causes movement; and a ray (07), which roughly represents the connection between user and user interface (UI).

The second step for achieving the Smooth Pointer is the interpolation of the reticle. The continuous interpolation process also occurs with the point position—the difference is that the smoothness is happening to a point in space instead of happening to the rotation. In other words, the process will continuously create an intermediate position in space while trying to reach the real position. With this, the pointer stabilization is achieved.

Figure 4:
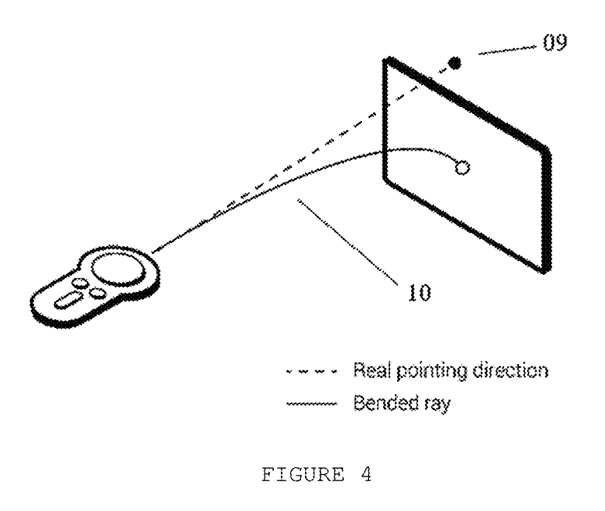
FIG. 4 discloses an example of how the Smooth Pointer component affects the ray and its behavior on an interface.

The third step is to create the ray curve. Its main goal is to provide feedback for the users, in order to confirm that the input is being processed even if it is happening slowly. In FIG. 4, a real pointing direction (09) is being achieved and, at the same time, the component is curving the ray (10) to represent the smoother movement—if the ray curve is removed, the user may feel that the application/system has a delay or lag. In order to curve the ray, a Bezier curve was used.

Figure 5:
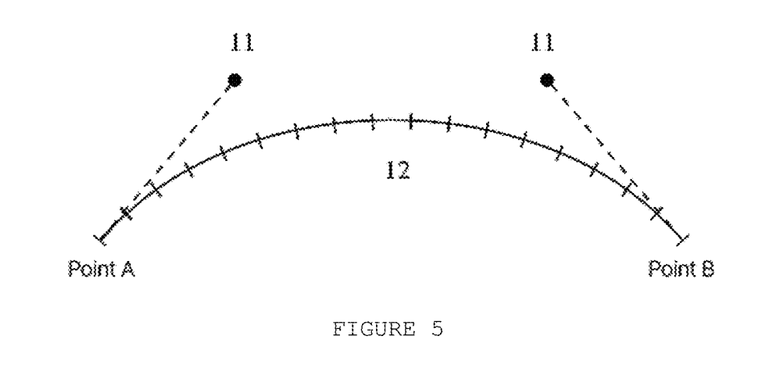
FIG. 5 illustrates a Bezier curve, a common concept for drawing smooth lines that are not straight.

The Bezier curve is presented in FIG. 5, with its control points (11) and subdivisions (12) along two given points. Bezier curves are a common concept for drawing smooth lines that are not straight. By using it, we have a curved line to represent that a controller is in one rotation and the reticle is in a different position. Since the Bezier curve bends according to the rotation's direction, users have both a feedback of action and direction. It is also possible to notice if the reticle is locked somewhere through the ray's behavior. For the present invention, a cubic Bezier function is used, wherein it is required to know an initial point, a final point and two intermediate points in order to draw the desired line. Similarly to the controller rotation and point position on space, these two intermediate points are interpolated with different speeds, which allows the component to create different behaviors on the ray.

Complementarily to the Smooth Pointer, the Aim Assist Area component was created. Aim Assist Area is the part of the concept that describes how the pointer will suffer interferences from the environment to help users have more stability while aiming at elements available in the interface. This component is based on two methods: Magnetism and Friction.

Magnetism is the behavior where the pointer will move inside a specified area (relative position) proportionally to movements done on a main area (real position). Furthermore, both vertical and horizontal relative positions can be calculated depending on what the user is trying to reach. As alluded through its name, this method uses the idea of magnetic fields that attract and affect the pointer's position and behavior.

Figure 6:
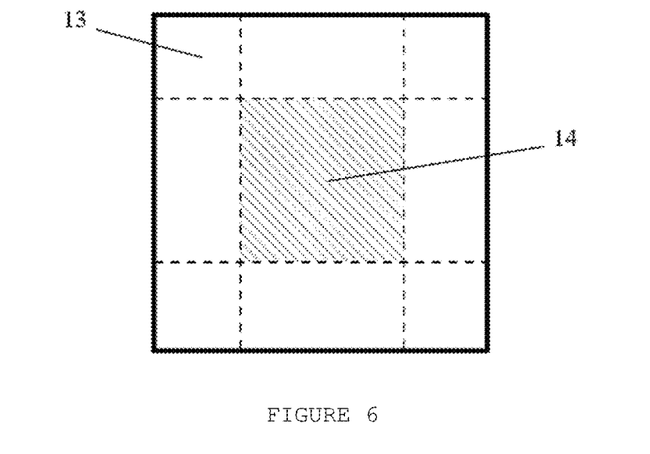
FIG. 6 discloses an overall explanation for the Magnetism method, where a main area and specified area (magnetic field) are displayed.
Figure 7:
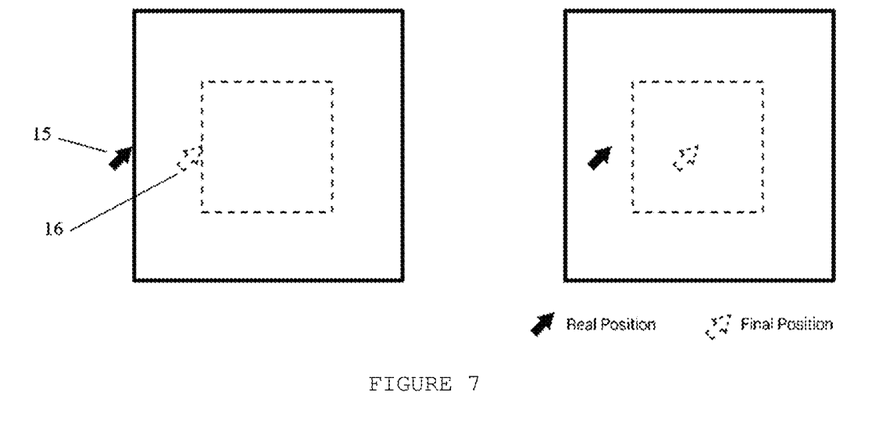
FIG. 7 illustrates further examples of how Magnetism works.

FIG. 6 depicts the areas related to Magnetism—the main area (13) is bigger and can be used for specifying the defined area (14) where the pointer is meant to be. This means that there is a part of the interface that the user will not be able to target with the pointer since movements in this area will move the pointer to a relative position in another previously specified area. This is better illustrated in FIG. 7, where the user does not see the Real Position pointer (15) after it reaches this "magnetic field", being used only to trigger the representation of a Final Position pointer (16) in the specified area.

Figure 8:
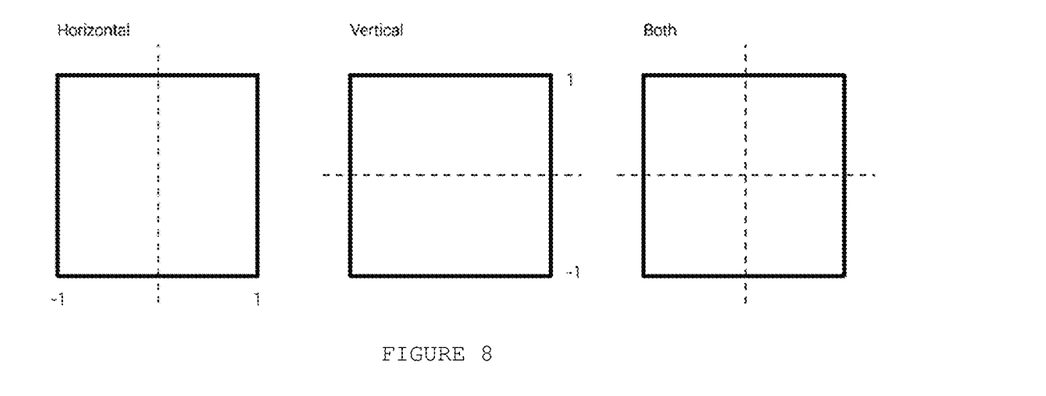
FIG. 8 demonstrates contents half-size division, a part of the Magnetism process.

As previously mentioned, the vertical and horizontal relative positions are calculated. The operation is divided by direction and is always done considering half the size of the meant direction (as presented on FIG. 8) and each direction is calculated independently from each other. The relative position on the specified area is also calculated using the "half-size" division.

Figure 9:
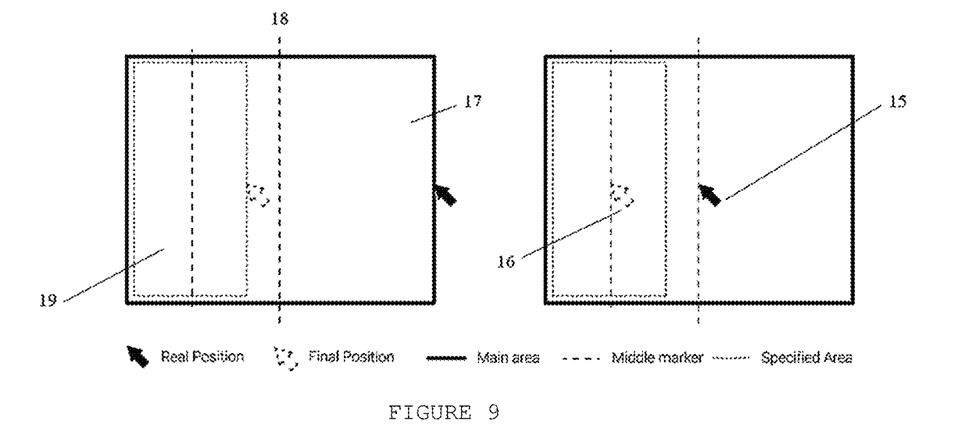
FIG. 9 discloses an example of how half-size divisions are used.

FIG. 9 depicts another scenario of how Magnetism can be applied. In this case, the specified area (19) is not in the middle (18) of the main area (17)—instead of always pulling the pointer to the middle of an element, this method always uses a specified area as reference.

The last method is the Friction. Friction is the behavior where a relative point in a specified area will move smoothly to a final position. This means that both the concept of continuous interpolation and Magnetism work together. To reach this behavior, the concept of continuous interpolation is also used but as a limitation to the movement of the pointer—the higher the friction level, the harder it is to move the pointer (and vice-versa). Friction occurs on pressed elements, creating the concept of "resistive drags".

Figure 10:
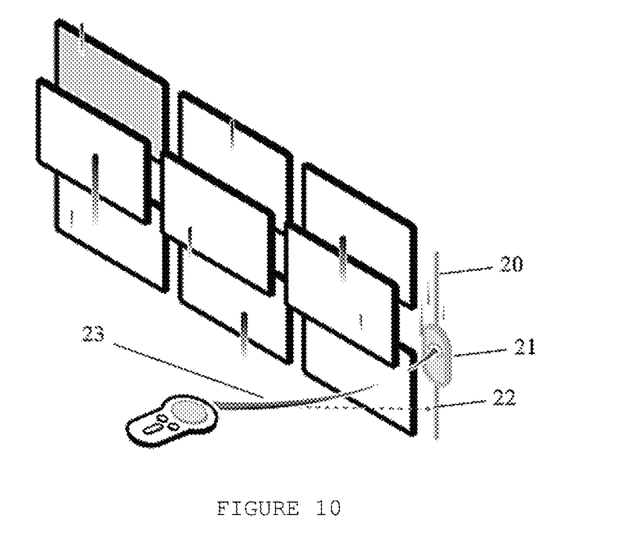
FIG. 10 illustrates how Friction works on a scroll bar.

FIG. 10 illustrates how the concept of Friction would work in a scroll bar (20)—while pressing and holding the scroll bar handle (21), the user is already aiming at his/her intended target position (22), but a friction value is applied to the pointer so that it takes a little longer for it to achieve this position making the movement slower and not too sudden. Furthermore, a visual feedback of this smoother movement is represented by the ray curve (23) that is formed depending on the user's intended direction.

Figure 11:
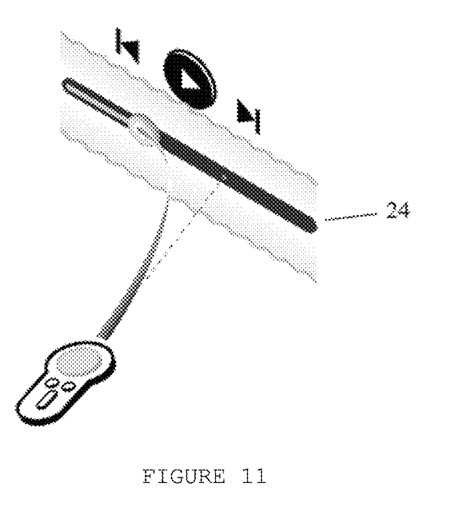
FIG. 11 illustrates an example in which both components (Smooth Pointer and Aim Assist Area) were implemented. In this case, a timeline.

Finally, FIG. 11 presents an example where both Smooth Pointer and Aim Assist Area were applied in order to make it easier for the user to select this timeline (24) and also to perform the scrubbing motion on the related content.

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

The invention claimed is:

1. A method for processing a virtual pointer in an application or virtual environment through a systematic asynchronous movement comprising:
   performing stabilization of pointer movement by a smooth pointer component;
   using magnetism to move the pointer inside a specified area proportionally to movements done on a main area; and
   using friction to create a concept of resistive drags,
   wherein performing stabilization of the pointer movement comprises controller rotation interpolation to be always as close as possible to the expected rotation, reticle interpolation creating an intermediate position in space, and creation of a ray curve providing feedback to users if input is being processed.

2. The method according to claim 1, wherein a ray is represented using Bezier curves providing a user with movement and direction feedback through its form.

3. The method according to claim 1, wherein facilitated aiming and resistive drags are part of one component capable of being used independently.

4. The method according to claim 2, wherein the ray is used as connection between source of the movement and its final representation.

5. The method according to claim 1, wherein, in facilitated aiming, a specific position on the main area is calculated to find a relative position on a specified area.

6. The method according to claim 1, wherein, in using friction to create a concept of resistive drags, movement values can be affected by a number of contents on an interface, or information density, creating a dynamic friction which can be done by a developer or automatically.

7. The method according to claim 1, wherein, in using friction to create a concept of resistive drags, a relative point in a specified area will move through a continuous interpolation process to a final pointed position.

* * * * *

UNITED STATES PATENT AND TRADEMARK OFFICE
CERTIFICATE OF CORRECTION

PATENT NO. : 10,607,568 B2
APPLICATION NO. : 16/013675
DATED : March 31, 2020
INVENTOR(S) : Alvaro Augusto Braga Lourenço et al.

It is certified that error appears in the above-identified patent and that said Letters Patent is hereby corrected as shown below:

On the Title Page

[Item (73)]
Delete "ELECTRÔNICA" and insert -- ELETRÔNICA --, therefor.

Signed and Sealed this
Fourth Day of August, 2020

Andrei Iancu
*Director of the United States Patent and Trademark Office*